(12) United States Patent
Stuart et al.

(10) Patent No.: US 8,728,437 B2
(45) Date of Patent: May 20, 2014

(54) SULFATE PROCESS

(75) Inventors: Alan David Stuart, New Lambton (AU); John Andrew Lawson, Belmont North (AU); Christopher Brett Ward, Attadale (AU); Hong Peng, St. Lucia (AU)

(73) Assignee: BHP Billiton Innovation Pty Ltd, Melbourne (AU)

( * ) Notice: Subject to any disclaimer, the term of this patent is extended or adjusted under 35 U.S.C. 154(b) by 198 days.

(21) Appl. No.: 13/063,890

(22) PCT Filed: Sep. 29, 2009

(86) PCT No.: PCT/AU2009/001296
§ 371 (c)(1),
(2), (4) Date: Jun. 6, 2011

(87) PCT Pub. No.: WO2010/034083
PCT Pub. Date: Apr. 1, 2010

(65) Prior Publication Data
US 2011/0229386 A1 Sep. 22, 2011

(30) Foreign Application Priority Data

Sep. 29, 2008 (AU) ............................... 2008905061

(51) Int. Cl.
*C01G 23/047* (2006.01)

(52) U.S. Cl.
USPC ............. 423/610; 423/615; 423/616; 423/83; 423/82; 423/85; 423/86

(58) Field of Classification Search
USPC ..................................................... 423/83, 610
See application file for complete search history.

(56) References Cited

FOREIGN PATENT DOCUMENTS

| WO | WO2005/038060 | 4/2005 |
| WO | WO2005/090619 | 9/2005 |
| WO | WO2006/105611 | 10/2006 |
| WO | WO2006/105612 | 10/2006 |
| WO | WO2006/105613 | 10/2006 |
| WO | WO2006/105614 | 10/2006 |
| WO | WO2008/028244 | 3/2008 |
| WO | WO2008/028245 | 3/2008 |

OTHER PUBLICATIONS

PCT/AU2009/001296 International Preliminary Report on Patentability dated Dec. 15, 2010, 28 pages.

*Primary Examiner* — Melissa Stalder
(74) *Attorney, Agent, or Firm* — Brinks Gilson & Lione; G. Peter Nichols

(57) ABSTRACT

A sulfate process for producing titania from a titaniferous material (as herein defined) including a step of leaching said titaniferous material with a leachant to form a process solution that includes an acidic solution of titanyl sulfate and iron sulfate, wherein said sulfate process further includes a filtration step comprising filtering said leachant to at least substantially remove titanyl sulfate particles from said leachant prior to supplying said leachant to said leach step.

30 Claims, 1 Drawing Sheet

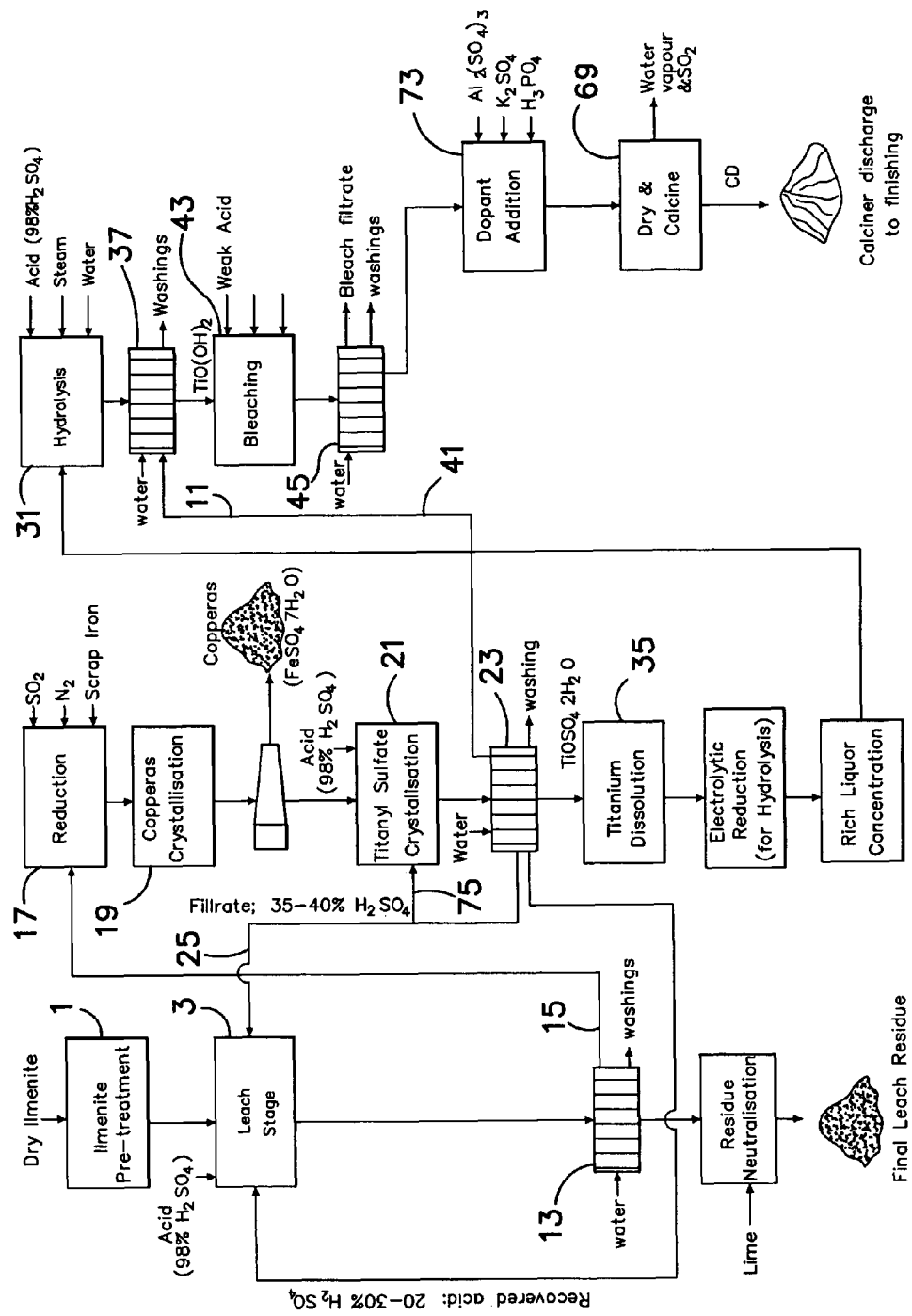

SULFATE PROCESS

This application claims priority to PCT Application Serial No. PCT/AU2009/001296 filed Sep. 29, 2009 published in English on Apr. 1, 2010 as PCT WO 2010/034083; and to Australian Application No. 2008905061 filed Sep. 29, 2008, the entire contents of each are incorporated herein by reference.

FIELD OF THE INVENTION

The present invention relates to a process for producing titania from a titaniferous material.

The term "titaniferous" material is understood herein to mean any titanium-containing material, including by way of example ores, ore concentrates, and titaniferous slags.

The present invention relates particularly to the sulfate process for producing titania from a titaniferous material.

The present invention relates particularly to a sulfate process developed by the applicant.

BACKGROUND TO THE INVENTION

International application PCT/AU2004/001421 in the name of the applicant describes an invention of the sulfate process made by the applicant (hereinafter referred to as "the sulfate process of the applicant"). The disclosure in the International application is incorporated herein by cross-reference.

In general terms, the sulfate process of the applicant described and claimed in International application PCT/AU2004/001421 is a sulfate process for producing titania from a titaniferous material (such as an iron-containing titaniferous material such as ilmenite) of the type which includes the steps of:

(a) leaching solid titaniferous material in multiple stages with a leach solution containing sulfuric acid and forming a process solution that includes an acidic solution of titanyl sulfate and iron sulfate;

(b) separating the process solution and a residual solid phase from the leach step (a);

(c) precipitating titanyl sulfate from the process solution from step (b);

(d) separating the precipitated titanyl sulfate from the process solution;

(e) treating the precipitated titanyl sulfate and producing a solution containing titanyl sulfate;

(f) hydrolysing the titanyl sulfate in the solution and forming a solid phase containing hydrated titanium oxides and a liquid phase;

(g) separating the solid phase containing hydrated titanium oxides and the liquid phase; and (h) calcining the solid phase from step (e) and forming titania.

In addition, the sulfate process of the applicant includes a step of removing iron sulfate from the process solution from step (b) and/or the depleted process solution from step (d) in the form of a slurry of solid iron sulfate crystals and the process solution.

In addition, as is described and claimed in a later-filed International application PCT/AU2007/001320 in the name of the applicant, the sulfate process of the applicant includes a ferric ion reduction step that lowers the concentration of ferric ions in the process solution.

The term "hydrated titanium oxides" is understood herein to include, by way of example, compounds that have the formula $TiO_2.2H_2O$ and $TiO_2.H_2O$.

In addition, the term "hydrated titanium oxides" is understood herein to include compounds that are described in technical literature as titanium hydroxide $(Ti(OH)_4)$.

Concentrations of metals mentioned hereinafter are understood herein as being determined by inductively coupled plasma (ICP) (all metals) or by titration (in the cases of Ti and Fe—ferrous and ferric).

The applicant has carried out further research work on the sulfate process of the applicant since the priority date of 17 Oct. 2003 of International application PCT/AU2004/001421 and has identified a number of features that are not disclosed in the International application that are important, separately and in combination, in order to operate the process effectively.

The further research work carried out by the applicant has resulted in the applicant achieving a better understanding of the impact of particulate titanyl sulfate on precipitation of titanyl sulfate from solution during the leach step. In particular, the applicant has found that the presence of particulate titanyl sulfate in the leaching solution during the leach step can act as a seed causing premature precipitation of dissolved titanyl sulfate from solution. The precipitation of particulate titanyl sulfate during the course of the leach step has a far greater adverse impact on the leach step than the applicant thought would be the case and is one of the major factors in preventing the achievement of high extraction rates.

It is to be understood that, if any prior art publication is referred to herein, such reference does not constitute an admission that the publication forms a part of the common general knowledge in the art, in Australia or any other country.

DESCRIPTION OF THE INVENTION

Accordingly, in broad terms, the present invention provides a sulfate process for producing titania from a titaniferous material (such as an iron-containing titaniferous material such as ilmenite) that includes a leach step that forms a process solution that includes an acidic solution of titanyl sulfate and iron sulfate as a result of leaching the solid titaniferous material with a leachant and hydrolysis and other steps that form titania from the titanyl sulfate in the process solution, and is characterised by filtering the leachant for the leach step to at least substantially remove titanyl sulfate particles from the leachant prior to supplying the leachant to the leach step.

The term "at least substantially remove titanyl sulfate particles" is understood herein to mean that the objective of the filtering step is to maximise the removal of titanyl sulfate particles.

The applicant has found that such particulate titanyl sulfate promotes unwanted precipitation of titanyl sulfate in the leach and that this has a far greater adverse impact on the leach step than the applicant thought would be the case and, therefore it is important to ensure that particulate titanyl sulfate is not introduced into the leach step. Precipitation of titanyl sulfate in the leach step makes it necessary to stop the leach step, separate the solid and liquid phases, and then continue the leaching of the titaniferous material in a successive leach stage. Multiple stage leaching is not of itself an issue. However, any leach step, whether it be a single stage or multiple stages is an issue if it is uncontrolled, and the applicant has found that the presence of particulate titanyl sulfate has an impact on control of the leach step. In this context, it is relevant to note that, typically, the leachant includes process solutions from steps in the process that are downstream of the leach step and, unless the leachant is filtered it will be inevitable that particulate titanyl sulfate will be carried into the leach step.

Typically, the leachant comprises fresh 98% sulfuric acid, filtrate containing 35-50% sulfuric acid from downstream steps in the process, and recovered acid containing 20-30% sulfuric acid from downstream steps in the process.

The single stage leach or multi stage may be carried out on a batch basis or on a continuous basis.

The leach step may be a single stage leach that extracts at least 65% of the titanium in the titaniferous material into solution in the process solution. The single stage leach may be as described in the specification of an Australian provisional application in the name of the applicant lodged on the same day as the subject application. The single stage leach may be carried out in a single tank or in a series of tanks, with material being transferred from one tank to a successive tank without a solid/liquid separation step between the tanks.

The leach step may be a multiple stage leach as described and claimed in International application PCT/AU2004/001421.

Preferably the filtration step includes filtering the leach liquor to remove particles that are not able to pass through a filter having 5 μm openings.

More preferably the filtration step includes filtering the leach liquor to remove particles that are not able to pass through a filter having 1 μm openings.

In a situation in which the single stage leach is carried out on a batch basis, preferably the leach includes supplying the filtered leachant to a batch tank, heating the filtered leachant to a required temperature, and adding the titaniferous material to the tank and allowing the leach to continue for a required leach time period.

Preferably the leach step does not include the addition of particulate titanyl sulfate.

More specifically, the sulfate process includes the steps of:

(a) leaching the solid titaniferous material with the filtered leachant and forming the process solution that includes the acidic solution of titanyl sulfate and iron sulfate;

(b) separating the process solution and a residual solid phase from the leach step (a);

(c) precipitating titanyl sulfate from the process solution from step (b);

(d) separating the precipitated titanyl sulfate from the process solution;

(e) treating the precipitated titanyl sulfate and producing a solution containing titanyl sulfate;

(f) hydrolysing the titanyl sulfate in the solution and forming a solid phase containing hydrated titanium oxides and a liquid phase;

(g) separating the solid phase containing hydrated titanium oxides and the liquid phase; and (h) calcining the solid phase from step (g) and forming titania.

The process of the present invention includes the following typical reactions.

Leaching:

Ferric Reduction:

may occur by reduction with iron metal or sulfur dioxide.

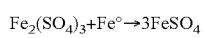

Ferrous Sulfate Crystallisation:

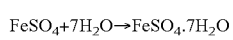

Titanyl Sulfate Precipitation:

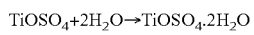

Hydrolysis:

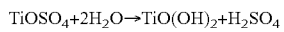

Calcination:

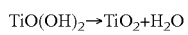

BRIEF DESCRIPTION OF THE DRAWING

The sulfate process of the present invention is now described further by way of example only with reference to the accompanying drawing, FIG. 1, which is a flow sheet of one embodiment of the sulfate process of the present invention.

DETAILED DESCRIPTION OF THE DRAWING

The flowsheet shown in FIG. 1 includes the following main steps:
(a) leach;
(b) ferric ion reduction;
(c) ferrous sulfate ("copperas") crystallisation;
(d) titanyl sulfate crystallisation;
(e) titanium dissolution;
(f) hydrolysis for pigment;
(g) bleaching; and
(h) calcination.

Each of the above steps (a) to (h) is described hereinafter in turn.

The following description is in the context of producing titania from a titaniferous material in the form of ilmenite. The present invention is not limited to this titaniferous material.

With reference to the flowsheet of FIG. 1, dry ilmenite from a storage area is pre-treated in a pre-treatment treatment step 1. The ilmenite pre-treatment may comprise the process described and claimed in International application PCT/AU2005/000387 in the name of the applicant which process includes contacting the titaniferous material with a reducing gas. Additionally or alternatively the ilmenite may be pre-treated by a conventional process such as grinding. The disclosure in the International application is incorporated herein by cross-reference.

(a) Leach Step

The pre-treated ilmenite is then supplied to the leach step. In the embodiment described herein, the leach step is a single stage leach.

It is noted that the present invention also extends to leach steps that include a multiple stage leach with solid/liquid separation between each leach stage.

The leach step includes one leach stage carried out on a batch basis in a tank 3 at a temperature of at least 80° C. for at least 5 hours.

The leach step includes supplying a leachant to the tank 3, heating the leachant to a required temperature such as 90° C., and adding the pre-treated ilmenite to the tank 3, and allowing the leach to continue for a required leach time period.

The leachant comprises fresh 98% sulfuric acid, filtrate containing 35-50% sulfuric acid from downstream steps in the process, and recovered acid containing 20-30% sulfuric acid from downstream steps in the process.

The starting acid concentration will depend on factors such as any one or more of the solubility of titanyl sulfate in the process solution, the target extraction of titanium into solution, the amount of the titaniferous material to be leached, the mineralogy of the material, and the amount of leachable material in the titaniferous material.

The leachant is filtered through a cloth having 5 μm, more preferably 1 μm, openings to at least substantially remove any particulate titanyl sulfate from the leachant before supplying the leachant to the tank 3. As is indicated above, the applicant has found that such particulate titanyl sulfate causes unwanted precipitation of titanyl sulfate in the leach.

The leach stage is carried out in a single tank 3 as indicated in the flowsheet or in multiple tanks (not shown) arranged in series without a solid/liquid separation between successive tanks.

The leach tank 3 shown in the flowsheet is a simple stirred tank. Fibre-reinforced plastic (FRP) is suitable for wetted parts. Other suitable materials are acid bricks and tiles.

The leach slurry discharged from the tank 3 is supplied to a filter 13 and washed with water. The filtrate from the filter 13, preferably a belt filter, forms a process solution and is supplied via a line 15 to a ferric ion reduction step 17. The filter cake from the filter 13 is neutralised with lime and is disposed of as a waste product.

The process conditions in the leach step are controlled to give a process solution of about 40 g/L Ti, 90-100 g/L Fe and 400-450 g/L acid in line 15. These are the preferred concentrations of Fe and Ti which avoid ferrous sulfate or titanyl sulfate precipitating out prematurely.

Leaching is at least 70%, preferably at least 80%, overall by the end of the single stage leach. Higher extractions are feasible.

Low acidity in the leach stages can cause the premature hydrolysis and precipitation of $TiO(OH)_2$. Typically this becomes significant below about 425 g/L $H_2SO_4$. Above 450 g/L $H_2SO_4$ the possibility of premature crystallisation of titanyl sulfate dihydrate $TiOSO_4.2H_2O$ increases.

(b) Ferric Ion Reduction Step

The purpose of the ferric ion reduction step 17 is to remove ferric ions from the process solution supplied from the leach step before the titanyl sulfate precipitation step.

The applicant has found that ferric ions precipitate and tend to be carried forward with the titanyl sulfate precipitate intermediate to subsequent steps of the process and has an adverse affect on these process steps and on ultimate product quality. Hence, in view of the co-precipitation of ferric ions and titanyl sulfate, it is desirable to remove ferric ions prior to the titanyl sulfate precipitation step.

Ferric ion reduction is achieved by treating the process solution for the leach step with a suitable reductant, such as any one or more of $Ti^{3+}$ ions, $SO_2$ gas, $H_2$ gas, Zn dust, Al dust and scrap iron, and converting the ferric ions to ferrous ions.

The ferric removal step could be before the copperas precipitation step discussed below in section (c), which removes the iron, or after the copperas precipitation step where the extra acid is required for the titanyl sulfate precipitation step.

An alternative process option is to include the steps of dispersing $SO_2$ into the process solution as the solution enters at the base of an activated carbon column, followed by nitrogen or air sparging of the solution to remove any unreacted $SO_2$. In this process option the solution would contain 0-1 g/L $Fe^{3+}$ and would not be further treated for ferric reduction.

(c) Ferrous Sulfate Precipitation Step

Almost all iron in solution eventually leaves the circuit as ferrous sulfate, typically ferrous sulfate heptahydrate ($FeSO_4.7H_2O$), in a ferrous sulfate, i.e. copperas, crystallization step 19.

Significant water is also removed from the process as the waters of crystallisation of the ferrous sulfate. This allows recovery and recycling of medium strength acid from the downstream hydrolysis step 31, leading to a much lower overall acid consumption per tonne of $TiO_2$ product.

In the ferrous sulfate precipitation step 19, the process solution from the ferric reduction step 17 is cooled to about 20° C. in a tank. This causes ferrous sulfate to precipitate out in the tank. The cooled process solution at this stage contains about 40 g/L Fe and 55 g/L Ti. The titanium ion concentration rises due to the lower volume of the cooled process solution.

Removal of water by evaporation during or after the ferrous sulfate precipitation step 19 may be included to give a further water credit. This assists the water balance of the overall process and enables more process solution to be re-used in the Leach Step instead of becoming a bleed stream from the process.

The precipitated ferrous sulfate may be separated from the process solution by a conventional centrifuge or by a belt filter.

The ferrous sulfate may be sold directly or converted to another saleable product.

Although 40 g/L Fe (as ferrous) remain in solution, the iron is recirculated through the process flowsheet and eventually returns to the ferrous sulfate precipitation step 19. The ferrous sulfate crystals therefore are essentially the only point of exit for iron from the circuit.

Mn, Al and Mg are minor elements which exit the circuit primarily with the ferrous sulfate crystals.

(d) Titanyl Sulfate Precipitation Step

In the titanyl sulfate precipitation step, generally identified by the numeral 21, fresh 98% sulfuric acid is added to the process solution from the ferrous sulfate precipitation step 19.

The process conditions cause titanium to precipitate out of the process solution as titanyl sulfate dihydrate, $TiOSO_4.2H_2O$, and to form a slurry in accordance with the following reaction:

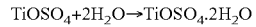

$$TiOSO_4 + 2H_2O \rightarrow TiOSO_4.2H_2O$$

The actual mechanism of precipitation is not clear.

The preferred operating temperature in the titanyl sulfate precipitation step is 110° C.

Precipitation is slower at less than 90° C.

Precipitation is self seeding in a continuous process—the kinetics of precipitation is accelerated by the presence of the product crystals. For batch operation, seed crystals may be provided, for example by retaining a small portion of slurry from a previous batch.

The solids in the slurry that is discharged from the precipitation tank or tanks are separated from the slurry by a filter 23, preferably a pressure filter, which forms a filter cake and a filtrate. The solids in the filter cake on the filter 23 are washed by recycled acid supplied from the hydrolysis step via a line 11 as this improves purity of the high strength Ti solution going to hydrolysis. A carefully controlled water wash is used to displace an optimal amount of the remaining acid in the filter cake on the filter 23. Reducing the acid concentration to below 200 g/L destabilises the solids, leading to ultimate dissolution of the solids. Cake squeezing and/or air blowing is then used to control the moisture content of the cake.

The filtrate from the filter 23 contains about 35-50% $H_2SO_4$, 5 g/L Ti and 40 g/L Fe. Some may be recycled if necessary to the titanyl sulfate precipitation stage tank 21 via line 75. The rest is sent to the leach stage 3 via line 25.

(e) Titanium Dissolution Step

The water washed filter cake discharged from the filter 23 is added to a stirred tank 35. Over a period of about 2 hours at 50-60° C. the cake dissolves into a high strength Ti titanyl sulfate solution. Lower temperatures can also be used, although the dissolution time may be longer than 2 hours.

The target Ti concentration is at least 200 g/L Ti (as $TiO_2$). The applicant has achieved Ti concentrations considerably exceeding 300 g/L Ti (as $TiO_2$) in laboratory and pilot plant work.

Moreover, in experimental work that included ferric ion control, as described above, the applicant achieved concentrations of less than 5 g/L Fe in the filter cake.

The dissolution process preferably requires less than 100 g/L acid in the solution contained within the filter cake to ensure that the process goes to completion. If most or all acid is washed out the free acid content of the high strength solution can be quite low.

The high strength solution produced in the stirred tank 35 is filtered through a filter cartridge (not shown) to remove siliceous and other fine particulate matter.

The $TiOSO_4.2H_2O$ in the filter cake does not immediately dissolve in water. Also, its solubility in greater than 20% $H_2SO_4$ is quite low. This suggests the dissolution process involves additional chemical steps. The remarkable solubility of Ti at low acidity (>200 g/L Ti) compared to in 20% $H_2SO_4$ (~5 g/L Ti) favours this view.

(f) Hydrolysis Step

The high strength Ti titanyl sulfate process solution produced in the stirred tank 35 is suitable for all conventional pigment hydrolysis processes.

It also may be used for continuous or batch precipitation of coarse high purity $TiO(OH)_2$.

The pigment hydrolysis processes are typically batch processes due to critical need to control particle size.

The process solution is pre-treated prior to the hydrolysis step 31 to generate about 2 g/L of $Ti^{3+}$ in the solution by conventional means. The $Ti^{3+}$ protects against oxidation of any iron to $Fe^{3+}$, which otherwise would co-precipitates with the Ti and imparts undesirable colour to the pigment.

The process solution is adjusted with acid to an A/T ratio suitable for pigment hydrolysis, using either concentrated $H_2SO_4$ or preferably hydrolysis filtrate.

The A/T ratio is a key process parameter. The A/T ratio is defined as:

$$[\text{Free acid+bound acid in TiOSO}_4]/[\text{TiO}_2]$$

All parameters are expressed in g/L.

In practice the [Free acid+bound acid in $TiOSO_4$] concentration is measured by a simple titration to pH 7 with sodium hydroxide solution, and the [$TiO_2$] g/L is Ti g/L+0.6.

Typically, the pigment industry prefers to operate hydrolysis with an A/T ratio in the range of 1.5:1 to 2.5:1, more preferably a ratio of 1.75:1, in order to produce a required particle size range for the pigment industry.

The hydrolysis step 31 is carried out by preheating a heel of water, typically 10-30% of the volume of feed solution, to about 96° C.

The process solution is also preheated to about 96° C. and then is pumped across to the batch hydrolysis tank over a fixed time period.

The hydrolysis tank is equipped with steam heating and a gate type rake stirrer, which operates at low rpm. Preferably the steam heating is indirect so that the filtrate is not diluted by condensate.

The initial few seconds of pumping cause the precipitation of very fine $TiO(OH)_2$ particles, which cause a milky aspect for about 30 seconds, then appear to redissolve. In practice the fine particles are colloidal nuclei which control the size of both the resulting precipitate and the crystal size in the calciner discharge. Control of this step is therefore key to preparing good pigment.

After all process solution is pumped across or dropped in from a header tank, the slurry temperature is carefully heated to the boiling point (typically at 1° C./minute).

The slurry is then boiled for about 5 hours, by which time the Ti remaining in solution has been lowered to about 5 g/L.

The slurry in the hydrolysis tank is then filtered on a filter 37, preferably a pressure filter, to produce a $TiO(OH)_2$ filter cake and a filtrate.

There are no special requirements outside what is typically practised in industry for filtration as the particle size has already been established. A range of filters are used across the industry. The particles naturally flocculate together and the filtration rate is fast enough that vacuum filtration may be used. The filter cake contains about 55% w/w of water.

The filtrate from the filter 37 contains 350-450 g/L $H_2SO_4$. This is returned via a line 11 to the filter 23 downstream of the titanyl sulfate precipitation tank 21.

(g) Bleaching Step

The $TiO(OH)_2$ filter cake that is discharged from the filter 37 is re-pulped with acid in a bleaching step 43.

A solution containing trivalent titanium ($Ti^{3+}$) is added to reductively leach out chromophores such as Fe, Cr, Mn and V, which otherwise would reduce the whiteness of the final pigment.

The bleaching step 43 typically takes place at 70-80° C. Rutile seed is added at this point The bleached slurry is filtered and washed in a filter 45, preferably a pressure filter.

(h) Calcination Step

The $TiO(OH)_2$ filter cake from the bleaching step 43 is mixed with a number of additives in a dopant addition step 73 and is then dried and calcined in a calciner 69.

The additives may be added as aqueous solutions or as solids. The additives may include 0.2% $K_2O$ as $K_2SO_4$, 0.6% ZnO as $ZnSO_4$ and 0.3% $P_2O_5$ as $H_3PO_4$.

The additives control development of the rutile crystals during calcination, such that the crystal size is 0.27±0.03 µm, rutilisation is 98.5±0.5%, the crystals have a lenticular shape and are not sintered together.

The product produced in the calciner 69 is then transported to downstream customers.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Many modifications may be made to the flow sheet described above and shown in the drawing without departing from the spirit and scope of the invention.

The invention claimed is:

1. A sulfate process for producing titania from a titaniferous material comprising:
   a. providing a leachant including particulate titanyl sulfate;
   b. filtering the leachant to substantially remove titanyl sulfate particles that are not able to pass through a filter having 1 µm openings to provide a filtered leachant;
   c. leaching said titaniferous material with the filtered leachant to form a process solution that includes an acidic solution of titanyl sulfate and iron sulfate wherein the filtering is effective to prevent unwanted precipitation of titanyl sulfate during leaching, and subsequent downstream steps comprising;
d. separating the process solution from a residual solid phase;
e. precipitating titanyl sulfate from the process solution from step (d);
f. separating the precipitated titanyl sulfate from the process solution;
g. treating the precipitated titanyl sulfate to produce a titanyl sulfate solution;
h. hydrolyzing the titanyl sulfate to form a solid phase containing hydrated titanium oxides and a liquid phase;
i. separating the solid phase and the liquid phase; and,
j. calcining the solid phase from step (i) to form titania.

2. The process of claim 1, wherein said leachant comprises fresh 98% sulfuric acid, filtrate containing 35-50% sulfuric acid from downstream steps in the process, and recovered acid containing 20-30% sulfuric acid from downstream steps in the process.

3. The process of claim 1, wherein the leaching step is conducted in a single stage.

4. The process of claim 1, wherein the leaching step is a single stage leach that extracts at least 65% of the titanium in the titaniferous material into solution in the process solution.

5. The process of claim 1, wherein the leaching step is a single stage leach carried out in a single tank or in a series of tanks, with material being transferred from one tank to a successive tank without a solid/liquid separation step between the tanks.

6. The process of claim 1, wherein the leaching step is a single stage leach that extracts at least 65% of the titanium in the titaniferous material into solution in the process solution, carried out on a batch basis.

7. The process of claim 6, wherein the leaching step includes supplying the filtered leachant to a batch tank, heating the filtered leachant to a temperature, and adding the titaniferous material to the tank and allowing the leach to continue for a leach time period.

8. The process of claim 1, wherein the titaniferous material is ilmenite.

9. The process of claim 1, further including a step of pretreating said titaniferous material prior to said leaching step, said pretreatment including contacting said titaniferous material with a reducing gas or grinding said titaniferous material.

10. The process of claim 1, wherein the leach is conducted at a temperature of at least 80° C. for at least 5 hours.

11. The process of claim 1, wherein the filtration step is conducted using a pressure filter or a belt filter.

12. The process of claim 1, wherein the process conditions in the leach step are controlled to give a process solution of about 40 g/L Ti, 90-100 g/L Fe and 400-450 g/L acid.

13. The process of claim 1, wherein the concentration of acid is from 425 g/L to 450 g/L $H_2SO_4$.

14. A sulfate process for producing titania from a solid titaniferous material includes the steps of:
(a) leaching the solid titaniferous material with a filtered leachant and forming a process solution that includes an acidic solution of titanyl sulfate and iron sulfate;
(b) separating the process solution and a residual solid phase from the leach step (a);
(c) precipitating titanyl sulfate from the process solution from step (b);
(d) separating the precipitated titanyl sulfate from the process solution;
(e) treating the precipitated titanyl sulfate and producing a solution containing titanyl sulfate;
(f) hydrolysing the titanyl sulfate in the solution of step (e) and forming a solid phase containing hydrated titanium oxides and a liquid phase;
(g) separating the solid phase containing hydrated titanium oxides and the liquid phase; and
(h) calcining the solid phase from step (g) and forming titania, wherein said process further includes the step:
(i) removing iron sulfate from the leach liquor from step (b) and/or the depleted liquor from step (d) and separating removed iron sulfate from the leach liquor, and wherein said process further includes the step:
(j) returning the process solution from step (d) to use for preparing the filtered leachant for step (a) by filtering the process solution to remove particles that are not able to pass through a filter having 5 μm openings.

15. The process of claim 14, comprising reducing ferric ion in the process solution for the leach step by treating said solution with a suitable reductant, selected from one or more of $Ti^{3+}$ ions, $SO_2$ gas, $H_2$ gas, Zn dust, Al dust and scrap iron.

16. The process of claim 15, wherein the ferric reduction step is conducted prior to the step of removing iron sulfate.

17. The process of claim 15, wherein the ferric reduction step is conducted after the step of removing iron sulfate.

18. The process of claim 15, wherein after reduction of ferric ion, the process solution is cooled to about 20° C. to thereby cause precipitation of iron sulfate.

19. The process of claim 14, wherein fresh 98% sulfuric acid is added to the process solution in step (c) to thereby cause precipitation of titanyl sulfate.

20. The process of claim 19, wherein step (c) is conducted at a temperature at 90° C. or higher.

21. The process of claim 14, wherein step (e) comprises redissolving the titanyl sulfate at a temperature of up to 60° C.

22. The process of claim 21, wherein the concentration of titanyl sulfate in solution is at least 200 g/L Ti (expressed as $TiO_2$).

23. The process of claim 14, wherein the solution of step (e) is pretreated prior to the hydrolysis step (f) to protect against oxidation of any iron to $Fe^{3+}$, preferably the pretreatment comprises generation of about 2 g/L $Ti^{3+}$ in solution.

24. The process of claim 14, wherein step (e) comprises adjusting an A/T ratio of the process solution with acid to within the range of 1.5:1 to 2.5:1.

25. The process of claim 14, further including the step of bleaching the solid phase produced in step (g).

26. The process of claim 25, wherein the bleaching step comprises repulping the solid phase and adding a solution of trivalent titanium to reduce any chromophores in said solid phase.

27. The process of claim 25, wherein said bleaching step takes place at 70 to 80° C.

28. The process of claim 14, wherein step (h) includes mixing additives with the solid phase, said additives controlling development of the titania crystals during calcination.

29. The process of claim 28, wherein said additives include $K_2O$, ZnO and/or $P_2O_5$.

30. The process of claim 28, wherein said titania is rutile and development of said titania crystals are controlled during calcination such that the crystal size is 0.27±0.03 μm, rutilisation is 98.5±0.5% and the crystals have a lenticular shape.

* * * * *